United States Patent [19]
Nagy

[11] 3,943,962
[45] Mar. 16, 1976

[54] UNIVERSAL EQUIPMENT FOR CONNECTING PIPE LINE FAVOURABLY FOR ADJUSTING VARIABLE ANGLES

[75] Inventor: Oszkár Nagy, Budapest, Hungary

[73] Assignee: Magyar Tudományos Akadémia Központi Kemiai Kutató Intezet, Budapest, Hungary

[22] Filed: Mar. 6, 1974

[21] Appl. No.: 448,632

[30] Foreign Application Priority Data
Mar. 6, 1973  Hungary ........................... MA 2457

[52] U.S. Cl. ................. 137/270; 251/148; 251/309
[51] Int. Cl.² ........................................... F16K 5/06
[58] Field of Search ............ 137/270, 270.5, 625.47; 251/148, 309, 315

[56] References Cited
UNITED STATES PATENTS

| | | | |
|---|---|---|---|
| 164,448 | 6/1875 | Hallett | 251/315 X |
| 604,771 | 5/1898 | Mansfield | 137/270 |
| 670,083 | 3/1901 | Osborne | 137/270 |
| 992,966 | 5/1911 | Kurz et al. | 251/309 |
| 1,031,642 | 7/1912 | Haase | 137/271 |
| 1,264,775 | 4/1918 | Coles | 251/309 X |
| 1,279,900 | 9/1918 | Pearsall | 251/309 X |
| 2,712,454 | 7/1955 | Love | 251/309 X |
| 3,016,062 | 1/1962 | Zinniger | 137/270 |
| 3,166,098 | 1/1965 | Jennings | 137/625.47 X |
| 3,270,772 | 9/1966 | Rakus | 251/315 X |

FOREIGN PATENTS OR APPLICATIONS

| | | | |
|---|---|---|---|
| 1,369,501 | 7/1964 | France | 251/315 |
| 716,610 | 10/1954 | United Kingdom | 251/315 |
| 824,649 | 12/1959 | United Kingdom | 251/315 |
| 647,005 | 8/1962 | Canada | 251/315 |

*Primary Examiner*—Alan Cohan
*Assistant Examiner*—Gerald A. Michalsky
*Attorney, Agent, or Firm*—Young & Thompson

[57] ABSTRACT

A pipe joint that interconnects two pipe sections or bosses for relative rotational movement about an axis that is noncoincident with the axis of at least one of the bosses and preferably noncoincident with the axis of both of the bosses. A rotary valve member rotates about that axis and has a bore therethrough that does not coincide with that axis, although preferably that axis and the axis of the bore intersect in the plane of the joint between the pipe sections. A valve operator may be disposed either in the plane of the intersection of the pipe sections, or else along the axis of rotation of the blocking and regulating element, that axis being perpendicular to that plane. The angle between the axis of the bore and the axis of rotation of the blocking and regulating element, is greater than zero but less than 90° and preferably about 45°. The valve operator can be a ring or handle disposed in the meridian plane of the pipe sections, or an axially protruding knob.

12 Claims, 19 Drawing Figures

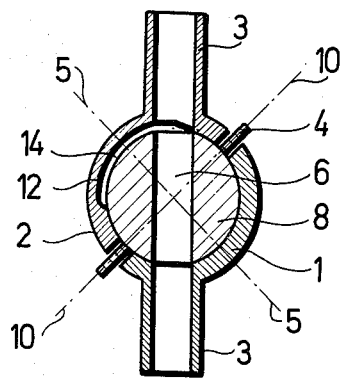
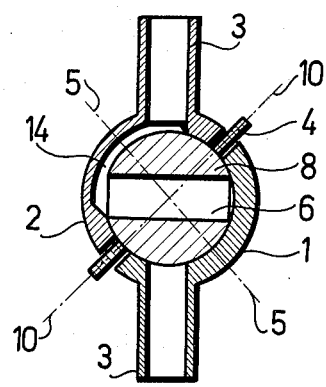
Fig.5  Fig.6
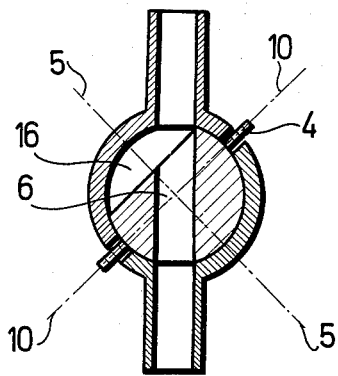
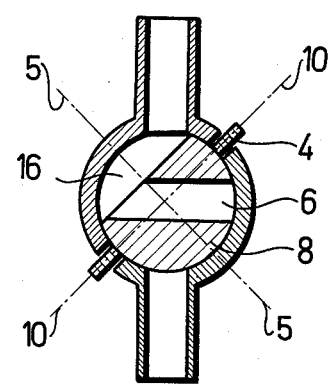
Fig.7  Fig.8
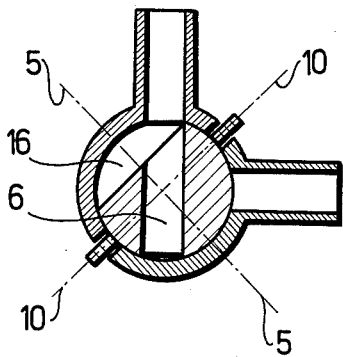
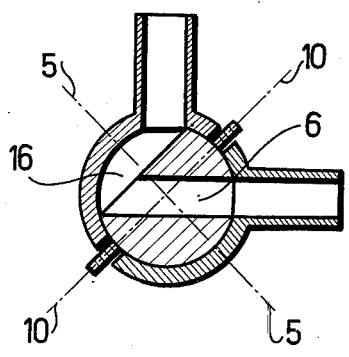
Fig.9  Fig.10

UNIVERSAL EQUIPMENT FOR CONNECTING PIPE LINE FAVOURABLY FOR ADJUSTING VARIABLE ANGLES

The present invention relates to angularly adjustable pipe joints with valves.

Of course many different types of pipe joints are known for the interconnection of pipe ends. Among such constructions are pipe couplers provided with threads, clamps or other coupling means. Such joints have in common the feature that they provide a rigid pipe connection wherein the angular position of the connected pipes is predetermined.

Angularly adjustable pipe joints are also known, in which the pipe joints come together along mating surfaces that are portions of spherical shells. However, it is difficult to adapt such constructions also to a valve function.

Spherical valves, however, are known, as in conventional faucet constructions. However, the position of the pipe sections on either side of the valve cannot be changed relative to each other. Other hemispherical and globe valves are also well known.

Accordingly, it is an object of the present invention to provide an angularly adjustable pipe coupling which also serves as a valve housing.

Another object of the present invention is the provision of a rotary valve having inlet and outlet portions disposed in relatively angularly adjustable portions of the valve housing.

Still another object of the present invention is the provision of an angularly adjustable pipe coupling with a valve, which will be relatively simple and inexpensive to manufacture, easy to assemble, install, operate, maintain and repair, and rugged and durable in use.

Broadly speaking, the objects of the present invention are achieved by providing a pipe joint that interconnects two pipe sections or bosses for relative rotational movement about an axis that is noncoincident with the axis of at least one of the bosses and preferably noncoincident with the axis of both of the bosses. A rotary valve member in the form of a blocking and regulating element rotates about that axis and has a bore therethrough that does not coincide with that axis, although preferably that axis and the axis of the bore intersect in the plane of the joint between the pipe sections. A valve operator for rotating the blocking and regulating element may be disposed either in the plane of the intersection of the pipe sections, or else along the axis of rotation of the blocking and regulating element, that axis being perpendicular to that plane.

The angle between the axis of the bore and the axis of rotation of the blocking and regulating element, is greater than zero but less than 90° and preferably about 45°. The valve operator can be a ring or handle disposed in the meridian plane of the pipe sections, or an axially protruding knob.

The pipe sections will be detachably interconnected on opposite sides of the above-mentioned meridian plane, for adjustive rotation relative to each other in that plane thereby to position the respective pipe bosses at different angular positions relative to each other while at the same time preserving the ability of the blocking and regulating element selectively to establish and interrupt and regulate communication between the pipe bosses or sections. To this end, conventional flange coupling means or the like for the pipe sections can be used, such as bolts, clamps, or the like; and when the valve operating member, that is, the means for rotating the blocking and regulating element, is a ring disposed in the above-mentioned meridian plane, then means external to the joint adjacent the meridian plane can be used for releasably holding the pipe ends in angularly adjusted position relative to each other.

The blocking surface is formed by the inner, concentric area of the half shell, present between the aperture of the pipe boss and the rim of the half shell.

The opposed half shell effects the closing or opening, by its fitting surface, of the bore connecting the aperture of the other half shell and the blocking and regulating element, depending on the position of the blocking element. This function is ensured equally well in any desired angular position of the pipe bosses.

The angle formed by the pipe bosses and the axis of rotation is determined by the adjustment of the pipe bosses. According to the invention, it is possible to vary the values for the angle formed by the longitudinal axes of the pipe bosses between 90° and 180°, although the device can be constructed so that the pipe bosses are adjusted along a circular path, i.e. within 360°; in this case, the longitudinal axes of the pipe bosses are not disposed in the same plane. The above-mentioned components are to be combined mechanically without impeding the blocking element in its motion.

According to the invention, the fitting surfaces of the individual components — or any one of the components — can consist of metal, quartz, glass, ceramic material, or a synthetic resin (for example polytetrafluoroethylene), or of a combination of these materials.

The universal device of the present invention will be described in greater detail with referennce to the appended drawings. In the drawings:

FIG. 5 shows a longitudinal sectional view of the device of FIG. 1 in the position wherein the blocking and regulating element is in the open condition;

FIG. 6 shows a longitudinal sectional view of the device of FIG. 5 in the position wherein the blocking and regulating element is in the blocking condition;

FIG. 7 shows an embodiment in a longitudinal sectional view wherein the blocking component disposed in one of the half shells is cut off through a plane in parallel to the meridian plane, and the blocking and regulating element is opened;

FIG. 8 shows the device of FIG. 7 in the blocked condition;

FIG. 9 is a section through the device of FIG. 7 wherein the blocking and regulating element is in the blocked condition and the angle formed by the longitudinal axes of the pipe bosses is 90°;

FIG. 10 is a sectional view of the device of FIG. 9, wherein the blocking element is in the opened condition;

Figure 13:
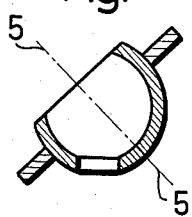
Figure 14:
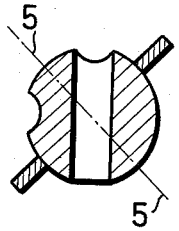
Figure 15:
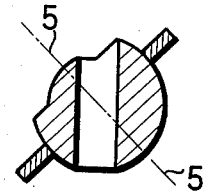
Figure 16:
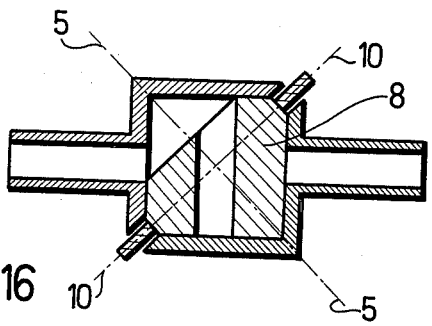
Figure 17:
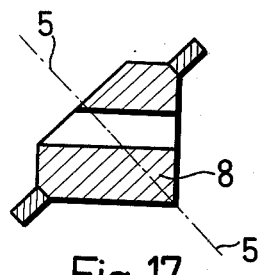
Figure 18:
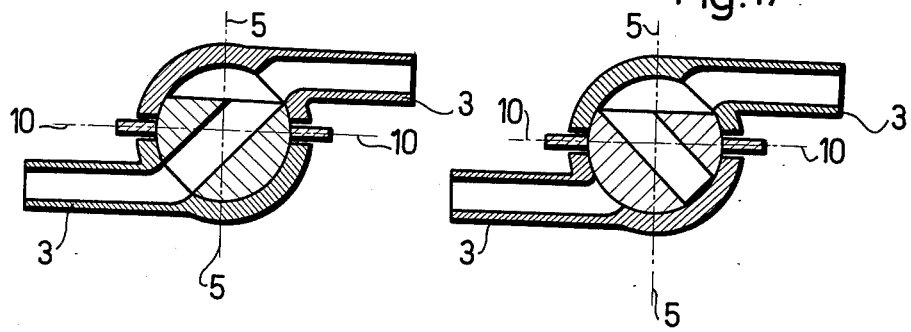
Figure 19:
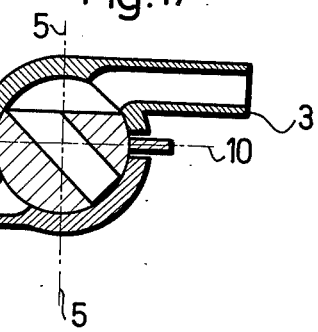

FIGS. 13, 14, and 15 represent the various configurations of the blocking and regulating element;

FIG. 16 is a sectional view of the device of this invention, wherein the rotationally symmetrical geometry of the fitting surfaces is a conical shell;

FIG. 17 shows the device of FIG. 16, turned into the open position;

FIG. 18 shows a sectional view of the device of this invention, wherein the pipe bosses connected to the half shells are disposed in parallel to the meridian plane, and the blocking and regulating element is in the opened condition; and FIG. 19 shows the device of this invention in a sectional view according to FIG. 18, in the blocked condition.

Figure 1:
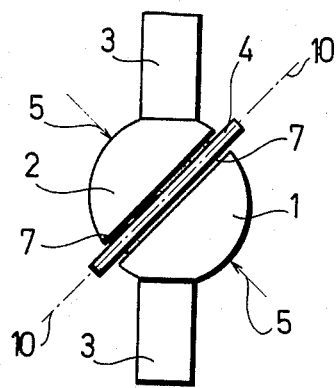
FIG. 1 shows one embodiment of the device of this invention.
Figure 2:
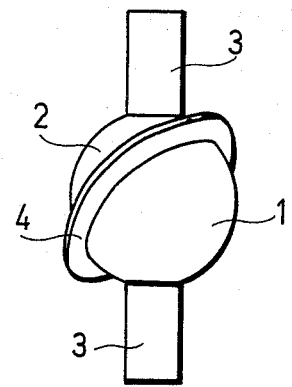
FIG. 2 shows the same device, with the difference that the blocking and regulating element is rotated along its longitudinal axis by 45°.

FIGS. 1 and 2 show respectively an advantageous construction of the device of this invention, wherein the blocking and regulating elements are rotated with respect to each other and with respect to the longitudinal axis of the device by an angle of 45°.

Figure 3:
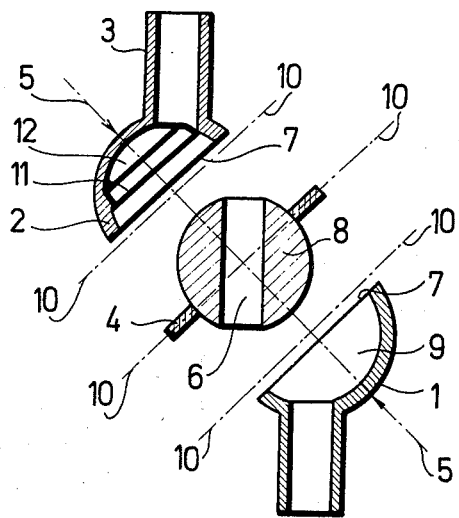
FIG. 3 shows a longitudinal sectional view of the device of FIG. 1 in the disassembled condition.
Figure 4:
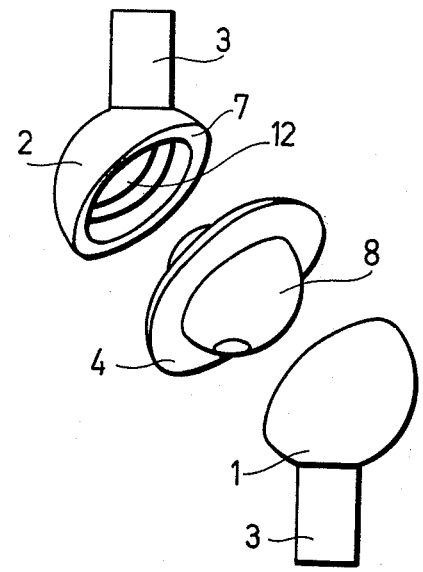
FIG. 4 shows the device of FIG. 2 in the disassembled condition in axonometric projection.

FIGS. 3 and 4 illustrate the device of FIG. 2 in a longitudinal sectional view and in the exploded condition.

The pipe bosses 3 adjoin the half shells 1, 2. The half shells surround the blocking and regulating element 8. A bore 6 is provided in the blocking and regulating element, the axis of this bore forming an angle of 45° with the axis of rotation 5 of the device. A ring 4 is arranged between the two half shells; this ring is guided by edge surfaces 7 on the half shells and serves for turning the blocking element. In the embodiment of FIG. 3, a recess 12 is provided in the contact surface of one of the half shells 2, which recess forms a circular opening 11. This recess connects the bore of the upper pipe boss 3 as shown by FIGS. 5 and 6 and the blocking element in any position of the valve.

The half shells of the device of this invention as shown in FIGS. 7, 8, and 9, 10 are produced analogously. The interior geometry is spherical, and this spherical surface forms the fitting surface between the half shells and the blocking element. In accordance with this embodiment, one end of the blocking and regulating element 8 is cut off by a surface parallel to the meridian plane, whereby a cavity 16 is produced between the blocking and regulating element and the shell.

The cavity 16 serves for the same purpose as the slots 14 in FIGS. 5 and 6, i.e. it ensures a connection in any position of the half shells and of the blocking and regulating member between the bore of the pipe section 3 on one side of the blocking member and the bore 6 of the blocking and regulating element 8. This embodiment is characterized in that the value of the angle formed by the longitudinal axes of the pipe bosses can be varied as desired between 180° and 90°.

The opened and blocked positions, respectively, of the device are illustrated in FIGS. 7 and 8 in correspondence with a coaxial arrangement of the pipe bosses and, in FIGS. 9 and 10, in correspondence with a right-angled arrangement of the pipe bosses.

FIGS. 13, 14, and 15 show the blocking and regulating elements in various exemplary constructions, in accordance with the device of FIGS. 7–10.

The slots 14 or the cavity 16, constituting the connection between the pipe bosses and the blocking element, can be fashioned so that an indentation is produced either at the blocking element or at the half shell or both, which indentation is oriented toward the opening of the pipe boss. Such a blocking and regulating element is illustrated in FIG. 14.

Figure 11:
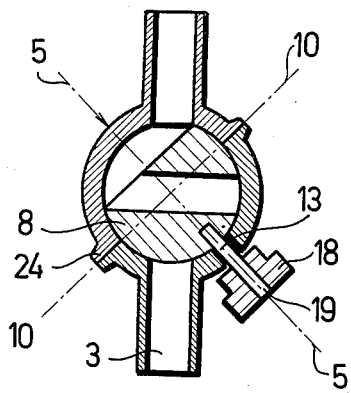
FIG. 11 shows an embodiment wherein the half shells are provided with a rim and the blocking and regulating element is attached by means of a pin carrying a handle or knob, which pin is fitted into the bore of one of the half shells, and wherein the element can thus be turned either into the open position or into the closed position.

The blocking and regulating element according to FIG. 11 is turned by means of a pin 19 extending through the bore 13 and concentric to the axis of rotation 5, which pin is preferably provided with an operating knob or handle 18.

The half shells can also be formed with a rim 24. These rims are roughened in order to ensure a secure mounting.

Figure 12:
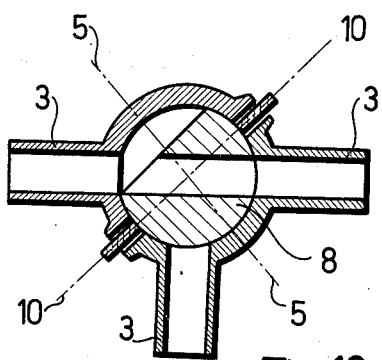
FIG. 12 shows an embodiment wherein two pipe bosses are mounted to one half shell, and the fitting surface of the half shells forms an angle of 45° with the axis of rotation.

The device of the invention as shown in FIG. 12 can be fashioned so that two pipe bosses are joined to one of the half shells; accordingly, the device has three pipe bosses in total.

The operating principle is as follows: When the blocking and regulating element 8 is turned, the half shell with one pipe boss connects alternatively one of the two pipe bosses provided at the other half shell. This means, at the same time, that the half shell provided with the two pipe bosses always has one pipe boss which is blocked.

According to FIG. 16, a device of this invention is constructed so that the rotationally symmetrical fitting surface is a conical shell or the shell of a truncated cone. The blocking and regulating element is shown in a sectional view in FIG. 17.

FIGS. 18 and 19 likewise show the device of this invention in a sectional view. The pipe bosses 3 are disposed in parallel to the plane determined by the meridian surface, whereby the angle formed by the longitudinal axes of the pipe bosses can have any desired value, and the two pipe bosses can be locked in position or moved into any position in two planes parallel to the meridian plane.

Having described my invention, I claim:

1. An angularly adjustable pipe joint with a valve, comprising two releasably interconnectible half shells that are adjustable relative to each other in a meridian plane about an axis perpendicular to said plane, each of said half shells having a pipe boss thereon that has an axis, the axis of at least one of said pipe bosses being out of coincidence with the first-mentioned axis, a rotatable blocking and regulating element disposed within the two half shells and having a bore therethrough out of registry with the first-mentioned axis, and means for rotating said element within said half shells about the first-mentioned axis, one end of said bore communicating with said boss of one of said half shells in all positions of said rotatable blocking and regulating element and said one half shell relative to each other, the other end of said bore communicating with said boss of the other of said half shells in less than all of the positions of said rotatable blocking and regulating element and said other half shell relative to each other.

2. A joint as claimed in claim 1, the axis of said bore forming an angle with said first-mentioned axis which is greater than 0° but less than 90°.

3. A joint as claimed in claim 2, said angle being about 45°.

4. A joint as claimed in claim 3, the axes of both of said pipe, bosses being out of registry with said first-mentioned axis.

5. A joint as claimed in claim 1, the axes of both said pipe bosses forming angles of about 45° with said first-mentioned axis.

6. A joint as claimed in claim 1, said means for rotating said element lying in said meridian plane.

7. A joint as claimed in claim 1, said means for rotating said element lying on said first-mentioned axis.

8. A joint as claimed in claim 1, said half shells being substantially symmetrical about said meridian plane.

9. A joint as claimed in claim 1, the axes of both of said bosses being disposed at an angle of about 45° to said plane.

10. A joint as claimed in claim 9, said bosses in one position of said joint being coaxial with each other and with said bore.

11. A joint as claimed in claim 1, said half-shells being semispherical.

12. A joint as claimed in claim 1, said half-shells and said rotatable blocking and regulating element having interengaging surfaces selected from the group consisting of metal, quartz, glass, ceramic material, synthetic resin and a combination thereof.

* * * * *